US011331679B2

(12) United States Patent
Stingel et al.

(10) Patent No.: US 11,331,679 B2
(45) Date of Patent: May 17, 2022

(54) CENTRIFUGAL SEPARATOR

(71) Applicant: Tetra Laval Holdings & Finance S.A., Pully (CH)

(72) Inventors: Kevin Stingel, Johnsburg, IL (US); Mikael Sundgren, Eslöv (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 963 days.

(21) Appl. No.: 15/989,709

(22) Filed: May 25, 2018

(65) Prior Publication Data

US 2019/0358650 A1    Nov. 28, 2019

(51) Int. Cl.
*B04B 1/08* (2006.01)
*A23C 9/14* (2006.01)
*B04B 7/14* (2006.01)

(52) U.S. Cl.
CPC ............... *B04B 1/08* (2013.01); *A23C 9/14* (2013.01); *B04B 7/14* (2013.01)

(58) Field of Classification Search
CPC ................................. B04B 1/08; A23C 19/14
See application file for complete search history.

(56) References Cited

FOREIGN PATENT DOCUMENTS

| DE | 287874 A5 | 3/1991 |
| DE | 288322 A5 | 3/1991 |
| EP | 2265378 B1 | 9/2015 |
| EP | 3315203 A1 | 5/2018 |
| WO | WO 2009/126104 | * 10/2009 |

OTHER PUBLICATIONS

International Search Report and Written Opinion of the International Searching Authority for corresponding PCT International Application No. PCT/EP2019/063215 dated Aug. 12, 2019.

* cited by examiner

*Primary Examiner* — Elizabeth Gwartney
(74) *Attorney, Agent, or Firm* — Renner, Otto, Boisselle & Sklar, LLP

(57) ABSTRACT

A centrifugal separator for separating milk into a cream phase and a skim milk phase is described. The separator includes a centrifuge bowl, a disc stack of conical discs arranged inside the centrifuge bowl. The disc stack includes a first set of discs and a second set of discs, the discs in the disk stack includes distribution openings such that the milk passes the first set of discs before passing the second set of discs. The discs in the first set of discs are separated from each other by a first distance, and the discs in the second set of discs are separated from each other by a second distance which is smaller than the first distance.

7 Claims, 4 Drawing Sheets

CENTRIFUGAL SEPARATOR

TECHNICAL FIELD

The invention relates to a centrifugal separator for separating milk into a cream phase and a skim milk phase, and to a method of separating cold milk.

BACKGROUND

Separators for separating milk into different phases of varying density under the influence of a centrifugal force are called centrifugal separators. The milk is introduced in a rotating disc stack of the centrifugal separator. Under the influence of the centrifugal force, heavier components and lighter fat globules in the raw milk begin to settle radially outwards respectively inwards in the separation channels according to their density. The cream, i.e. the fat globules, has a lower density than the skim milk and therefore moves inwards over the disks, towards the separator's axis of rotation. The cream continues to an axial outlet and the heavier phase, i.e. the skim milk, moves outwards to the space outside the disc stack and from there to a skim milk outlet. A problem with previous separators is that the efficiency is reduced in certain operating conditions. For example, the skimming performance may be reduced under low temperature conditions.

SUMMARY

It is an object of the invention to at least partly overcome one or more limitations of the prior art. In particular, it is an object to provide an improved centrifugal separator for separating milk, in particular allowing for an improved skimming performance over a wider temperature range and which requires less maintenance.

In a first aspect of the invention, this is achieved by a centrifugal separator for separating milk into a cream phase and a skim milk phase. The separator comprises a centrifuge bowl and a disc stack of conical discs arranged inside the centrifuge bowl. The disc stack comprises a first set of discs, and a second set of discs. The discs in the disk stack comprises distribution openings such that the milk passes the first set of discs before passing the second set of discs. The discs in the first set of discs are separated from each other by a first distance, and the discs in the second set of discs are separated from each other by a second distance which is smaller than the first distance.

In another aspect of the invention, this is achieved by a method of separating cold milk using a separator according to the first aspect. The method comprises providing a flow of the milk through a first set of discs in a disc stack arranged in the separator, and providing a flow of the milk through a second set of discs, stacked on top of the first set of discs.

Having first and second set of discs where the discs in the second set are separated from each other by a distance which is smaller than the distance between discs in the first set allows for an initial separation of larger flat globules from the milk in the first set of discs, with a lowered risk for build-up of fat between the discs, while the smaller separation in the second set of discs provides for maintaining a high skimming efficiency.

Still other objectives, features, aspects and advantages of the invention will appear from the following detailed description as well as from the drawings.

DRAWINGS

Embodiments of the invention will now be described, by way of example, with reference to the accompanying schematic drawings.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
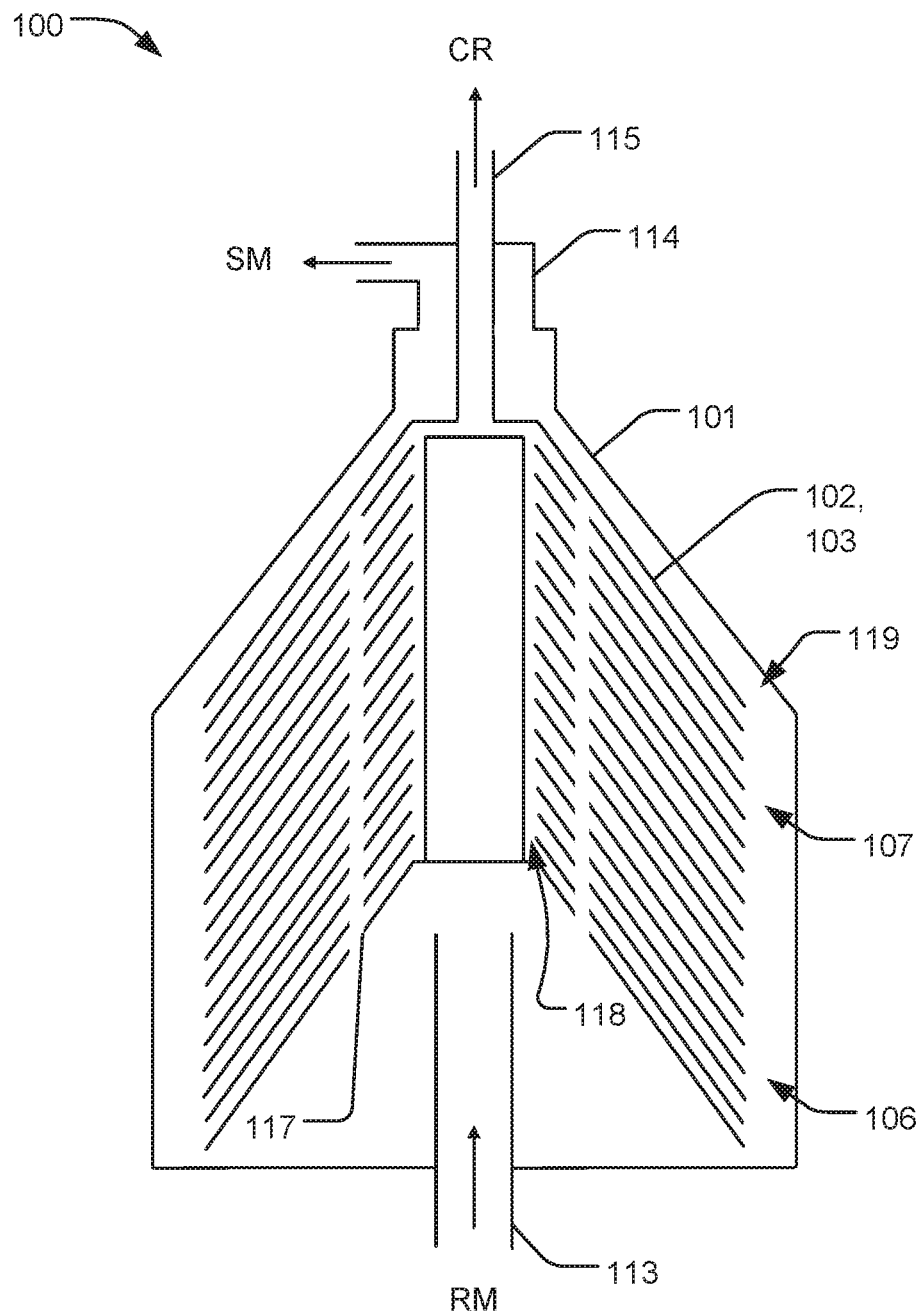
FIG. 1 is a cross-sectional side view of a centrifugal separator for separating milk into a cream phase and a skim milk phase.

FIG. 1 is a schematic illustration of a separator 100 for separating milk (RM) into a cream phase (CR) and a skim milk phase (SM). The separator 100 comprises a centrifuge bowl 101 and a disc stack 102 of conical discs 103 arranged inside the centrifuge bowl 101. The milk (RM), which typically is so called raw milk, enters the centrifuge bowl 101 via an inlet 113, and is subsequently separated into the skim milk phase (SM) and the cream phase (CR) at the top of the centrifuge bowl 101. I.e. milk (RM) flows from the inlet 113 into distribution openings 117 in the disc stack 102, and the cream phase (CR) is centrifuged towards a center portion 118 or the disk stack 102 and flows from the center portion 118 to a cream phase outlet 115, whereas the skimmed milk phase (SM) is centrifuged towards a periphery 119 of the disc stack 102 and flows from the periphery 119 to an outlet 114 for the skimmed milk phase (SM).

Figure 2:
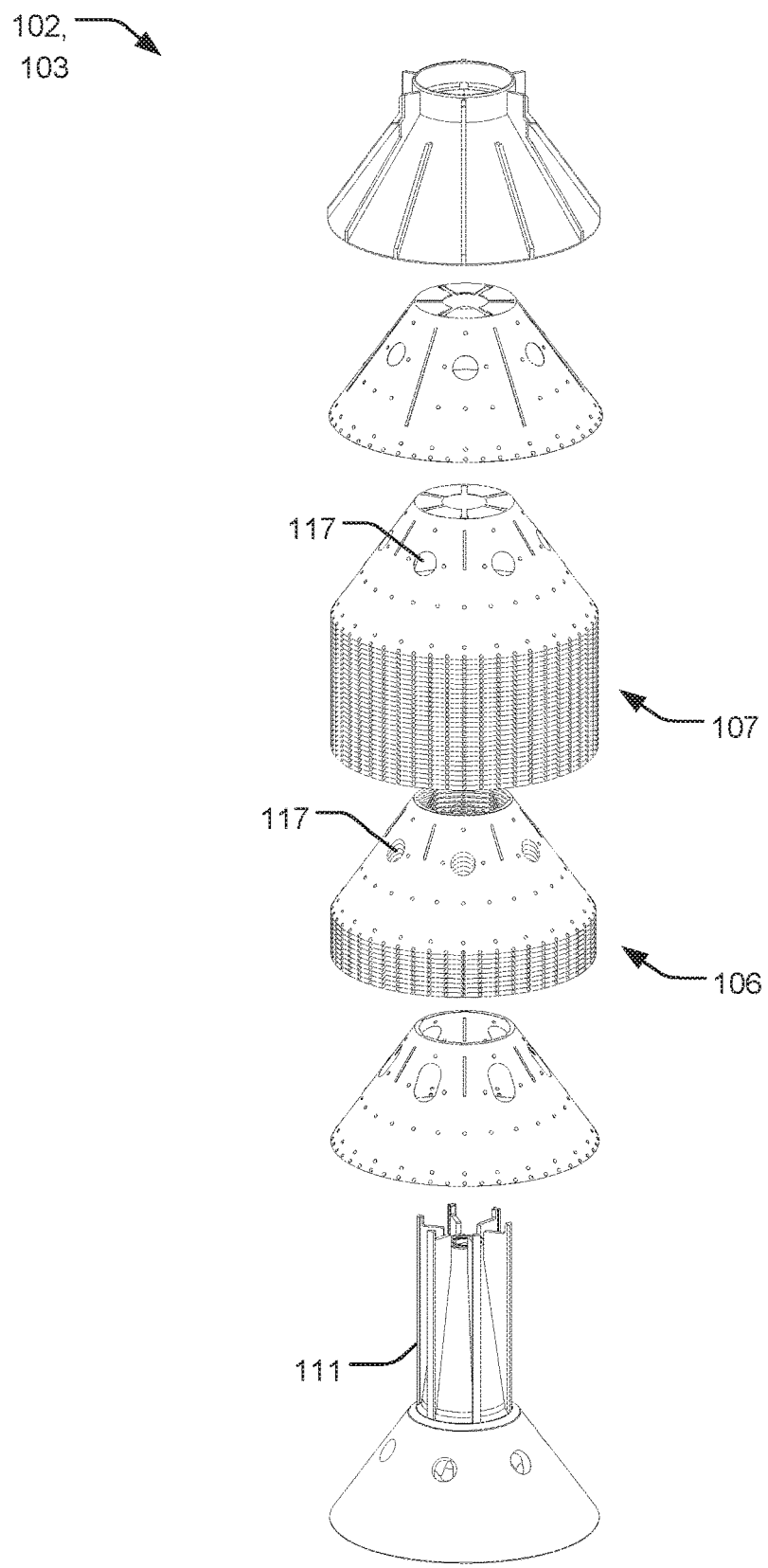
FIG. 2 is an exploded perspective view of a centrifugal separator with a disc stack having first and second sets of discs.
Figure 3:
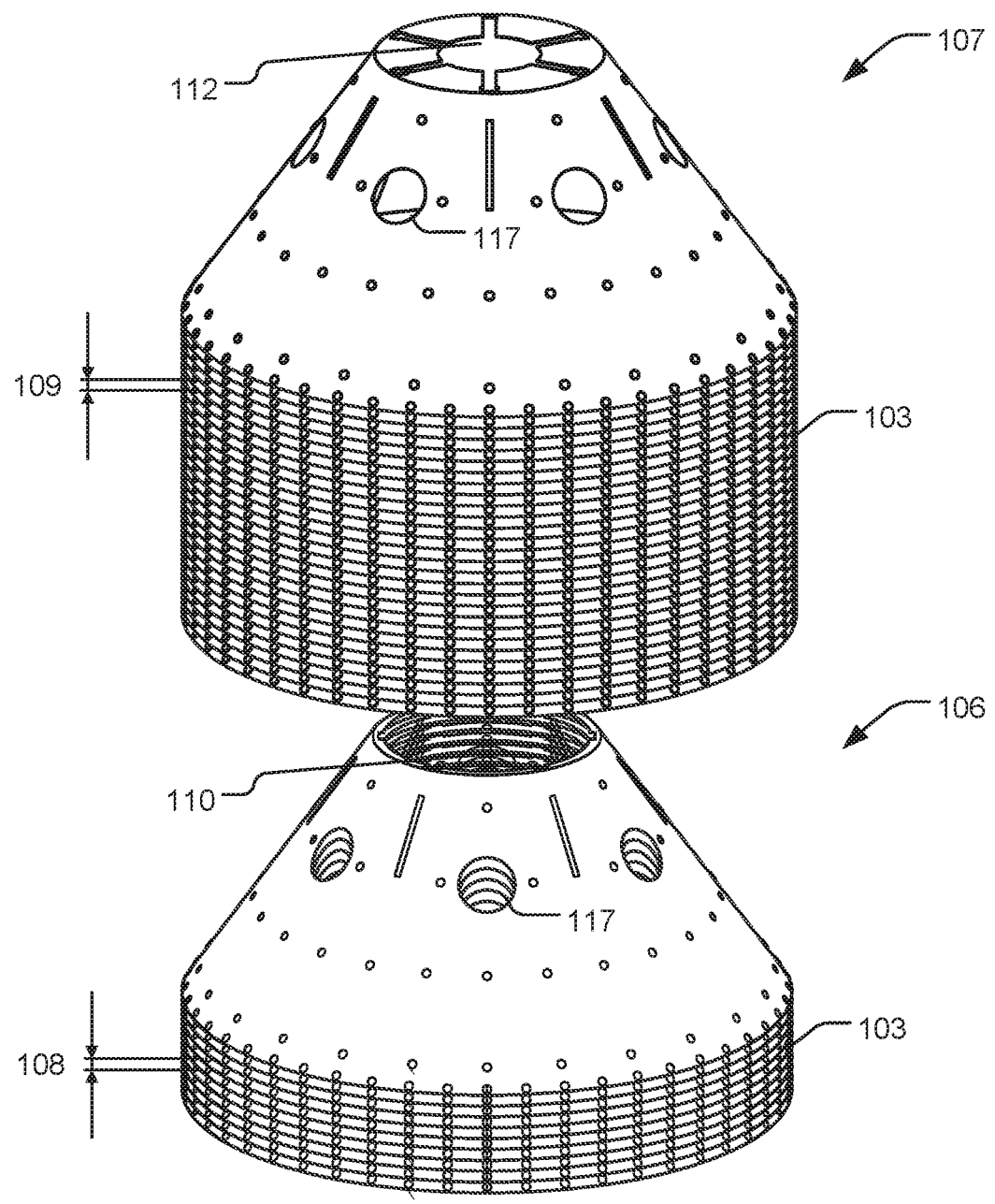
FIG. 3 is a further detailed perspective view of first and second sets of discs in the disc stack.

FIG. 2 and FIG. 3 show an example of the disc stack 102 in an exploded perspective view. The disc stack 102 comprises a first set of discs 106 and a second set of discs 107. The discs 103 in the disk stack 102 comprises the aforementioned distribution openings 117 such that the milk (RM) passes the first set of discs 106 before passing the second set of discs 107. The discs 103 in the first set of discs 106 are separated from each other by a first distance 108, and the discs 103 in the second set of discs 107 are separated from each other by a second distance 109. FIG. 3 is a further detailed perspective view of the first and second sets of discs 106, 107, having respective separation distances 108 and 109. The second distance 109 is smaller than the first distance 108. I.e. the spacing between the discs 103 in the second set of discs 107 is smaller than the spacing between the discs 103 in the first set of discs 106. The distance or spacing between the discs 103 in the first and second sets 106, 107, is sometimes also referred to as the caulk height. The caulk height in the second set of discs 107 is thus smaller than the caulk height in the first set of discs 106. Having discs 103 in the first set 106 which are separated from each other by a distance which is larger than the distance between the discs 103 in the second set 107 allows for an initial separation of larger flat globules from the milk in the first set of discs 106, with a lowered risk for build-up of fat between the discs 103 due to the larger separation thereof, while the smaller separation in the second set of discs 107 provides for maintaining a high skimming efficiency for a given size of the separator 100. When the milk flows into the second set of discs 107, the fat globules has decreased in amount and/or size. The risk of occlusion or plugging of fat in the disc stack 102 is thus reduced while a high efficiency can be provided. This is particularly advantageous in low temperature conditions where the milk is not heated, as the tendency for accumulation of the fat is increased in these cases. As the risk of fat occlusion is reduced, there is also a reduced need for cleaning the disc stack 102. I.e. less resources has to be spend on the maintenance of the separator 100, and the throughput in the production line can also be increased due to less interruptions from maintenance operations.

The number of discs 103 in the second set of discs 107 may be higher than the number of discs 103 in the first set of discs 106, as schematically illustrated in FIG. 3. This provides for achieving a high skimming efficiency, as the number of discs 103 in the second set 107 can be increased more by having a smaller separation distance 109, compared to the discs 103 in the first set 106, for a given size of the separator 100. At the same time, the discs 108 of the first set 106 provides for the initial separation of larger fat globules as described above, although being fewer in number than the discs 103 of the second set 107. A compact separator 100 with increased low temperature efficiency may thus be provided.

A ratio between the number of discs 103 in the second set of discs 107 to the number of discs 103 in the first set of discs 106 may be in the range of 2-6. This allows for a reduced risk of fat occlusion in the disc stack 102 while the skimming efficiency is increased. The ratio between the number of discs 103 in the second set of discs 107 to the number of discs 103 in the first set of discs 106 may be in the range of or 3-5, which provides for a separator 100 which is particular advantageous in terms of skimming efficiency.

The number of discs 103 in the first set of discs 106, having the increased separation distance 108, may be in the range of 20-50 discs. Having a number of discs 103 of the first set 106 in this range provides for facilitating the initial separation of fat globules with a lowered risk of blockage by fat between the discs 103. At the same time this allows for having a plurality of discs 103 in the second set 109 that increases the skimming performance for a given size of the separator 100. In one example the number of discs 103 in the first set of discs 106 is in the range 35-40, and the number of discs 103 in the second set of discs 107 is in the range 145-165.

A ratio between the first distance 108 to the second distance 109 may be in the range of 1.2-2.4. I.e. the first set of discs 106 are separated from each other by a first distance 108 which is larger than the separation distance 109 between the discs 103 of the second set 107 by a factor which is in the range 1.2-2.4. This provides for an increased skimming performance at low temperature conditions. A ratio between the first distance 108 to the second distance 109 in the range of 1.25-1.60 provides for a particularly advantageous separator 100 with an increased skimming performance at low temperatures for a given volume of the separator 100.

In one example the ratio between the first distance 108 to the second distance 109 may be 1.33 for an optimized skimming efficiency of the separator 100 in some low temperature operating conditions.

The discs 103 in the first set of discs 106 may be separated by 0.75-0.85 mm. Having a separation of the discs 103 in the first set 106 in this range provides for a particular advantageous separation of larger fat globules in the milk with a further reduced risk of occluding the space between the discs 103 with fat.

The discs 103 in the second set of discs 107 may be separated by 0.55-0.65 mm. Having a separation of the discs 103 in the second set 107 in this range, e.g. in combination with a separation in the range 0.75-0.85 mm of the first set 106, allows at the same time for increasing the overall skimming performance for a given volume of the separator 100 while avoiding blockage problems when separating milk of low temperature. In one example the discs 103 in the first and second sets 106, 107, may be separated by 0.8 mm and 0.6 mm, respectively, for an optimized performance in some operating conditions, e.g. with a temperature of the milk in the range of 10-18° C.

The discs 103 in the first set of discs 106 may have an open center portion 110 for receiving a centering element 111 arranged in the centrifuge bowl 101. The open center portion 110 in the first set of discs 106 is illustrated in the example of FIG. 3, and the centering element 111 is shown in FIG. 2. The discs 103 in the first set 103 may thus be accurately aligned with the axis of rotation of the centrifuge bowl 101.

The discs 103 in the second set of discs 107 may have a reduced diameter center portion 112 coaxially aligned with the open center portion 110 of the discs 103 in the first set of discs 106. The reduced diameter center portion 112 of the discs 103 in the second set 107 is shown in the example of FIG. 3. In this example the opening in the center of the discs 103 of the second set 107 is partly closed in comparison to the discs 103 in the first set 106.

Figure 4:
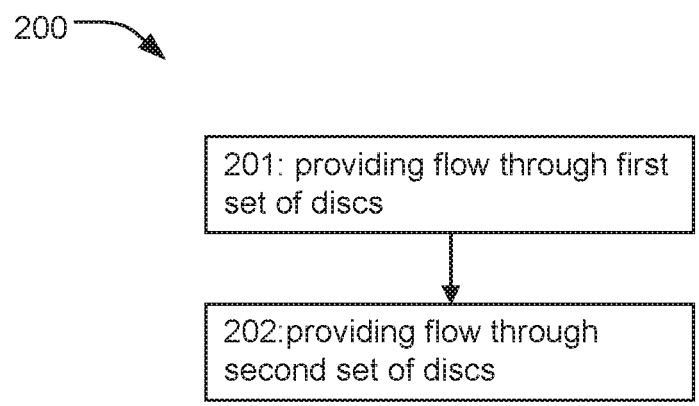
FIG. 4 is a flowchart of a method of separating cold milk.

FIG. 4 illustrates a flow chart of a method 200 of separating cold milk using a separator 100 as described above in relation to FIGS. 1-3. The method 200 comprises providing 201 a flow of the milk through a first set of discs 106 in a disc stack 102 arranged in the separator 100, and providing 202 a flow of the milk through a second set of discs 107, stacked on top of the first set of discs 106. The discs 103 in the first set of discs 106 are separated from each other by a first distance 108, and the discs 103 in the second set of discs 107 are separated from each other by a second distance 109 which is smaller than the first distance 108. The method 200 thus allows for an efficient separation of cold milk with a reduced risk of blockage in the disc stack 102 by the fat in the milk, as described above in relation to the separator 100 and FIGS. 1-3.

The cold milk may be milk which is not heated. The temperature of the cold milk may be below 30° C. or below 20° C. in some examples. The temperature of the cold milk may also be below 17° C. or below 14° C. in some examples. The temperature of the cold milk may also be below 13° C. or below 10° C. in some examples. The tendency of the fat to form larger aggregates of fat particles may increase with the lowering of the temperature. Thus, the separator 100 provides for a particularly advantageous increase in skimming efficiency and reduced risk of such fat blockage of fat blockage as the temperature of the milk is reduced further across the ranges as exemplified above.

From the description above follows that, although various embodiments of the invention have been described and shown, the invention is not restricted thereto, but may also be embodied in other ways within the scope of the subject-matter defined in the following claims.

The invention claimed is:

1. A method of separating cold milk using a centrifugal separator for separating milk into a cream phase and a skim milk phase, the separator comprising a centrifuge bowl, and a disc stack of conical discs arranged inside the centrifuge bowl, the disc stack comprising a first set of discs, and a second set of discs, the discs in the disk stack comprising distribution openings such that the milk passes the first set of discs before passing the second set of discs, wherein the discs in the first set of discs being separated from each other by a first distance, and the discs in the second set of discs being separated from each other by a second distance which is smaller than the first distance, and wherein a number of discs in the second set of discs is higher than a number of discs in the first set of discs, the method comprising:

providing a flow of the milk through the first set of discs in the disc stack arranged in the separator, and thereafter providing the flow of the milk through the second set of discs, which is stacked on top of the first set of discs.

2. The method according to claim 1, wherein the cold milk is milk which is not heated.

3. The method according to claim 2, wherein the temperature of the cold milk is below 30° C.

4. The method according to claim 2, wherein the temperature of the cold milk is below 17° C.

5. The method according to claim 2, wherein the temperature of the cold milk is below 13° C.

6. The method according to claim 1, wherein a ratio between the number of discs in the second set of discs to the number of discs in the first set of discs is in a range of 2 to 6.

7. The method according to claim 1, wherein the number of discs in the first set of discs is in a range of 20 to 50 discs.

* * * * *